United States Patent
Werner et al.

(10) Patent No.: US 11,994,242 B2
(45) Date of Patent: May 28, 2024

(54) COUPLING SEAL FOR PIPE LINERS

(71) Applicant: Little Chief Industries, Inc., Independence, KS (US)

(72) Inventors: Robert Werner, Grove, OK (US); Steve Werner, Independence, KS (US)

(73) Assignee: Little Chief Industries, Inc., Independence, KS (US)

( * ) Notice: Subject to any disclaimer, the term of this patent is extended or adjusted under 35 U.S.C. 154(b) by 0 days.

(21) Appl. No.: 17/961,651

(22) Filed: Oct. 7, 2022

(65) Prior Publication Data

US 2023/0113653 A1    Apr. 13, 2023

Related U.S. Application Data

(60) Provisional application No. 63/253,614, filed on Oct. 8, 2021.

(51) Int. Cl.
*F16L 15/04* (2006.01)
*F16L 15/00* (2006.01)

(52) U.S. Cl.
CPC ............. *F16L 15/04* (2013.01); *F16L 15/006* (2013.01); *F16L 2201/20* (2013.01)

(58) Field of Classification Search
CPC .... F16L 15/04; F16L 58/1018; F16L 58/1036
USPC ......................................................... 285/55
See application file for complete search history.

(56) References Cited

U.S. PATENT DOCUMENTS

| | | | |
|---|---|---|---|
| 317,408 A | 5/1885 | Moeser | |
| 343,246 A | 6/1886 | Lee | |
| 924,390 A | 6/1909 | Smith | |
| 1,188,485 A | 6/1916 | Pruyn | |
| 1,816,293 A | 7/1931 | Oberhuber | |
| 2,261,566 A | 11/1941 | Russell et al. | |
| 2,572,058 A | 10/1951 | Sarosdy | |
| 2,746,486 A | 5/1956 | Gratzmuller | |

(Continued)

FOREIGN PATENT DOCUMENTS

| | | |
|---|---|---|
| DE | 1068068 B | 10/1959 |
| DE | 119052 B | 4/1965 |

(Continued)

OTHER PUBLICATIONS https://sealtitelining.com; Seal Tite Systems—PVC & CPVC Lining Systems; Jun. 8, 2021.

(Continued)

*Primary Examiner* — David Bochna (74) *Attorney, Agent, or Firm* — Head, Johnson, Kachigian & Wilkinson, PC (57) ABSTRACT

A coupler for lined pipe joints in a lined pipe system. The coupler for a lined pipe system, having lined pipe section ends with an inner diameter. A substantially cylindrical hollow body includes an outer surface, an inner surface, two opposing open ends, and a longitudinal center between the two opposing open ends. A ridge extends radially outwardly from the outer surface at the longitudinal center. A hollow radial barb, with a point having a maximum diameter and a hollow section, is symmetrically disposed on the outer surface between each opposing open end and the ridge wherein the radial barbs extend outwardly from the outer surface and away from the ridge.

10 Claims, 6 Drawing Sheets

(56) References Cited

U.S. PATENT DOCUMENTS

| | | |
|---|---|---|
| 2,901,269 A | 8/1959 | Rickard |
| 2,915,322 A | 12/1959 | Dunlop |
| 2,932,531 A | 4/1960 | Briechle |
| 2,938,562 A | 5/1960 | Watts et al. |
| 3,202,562 A | 8/1965 | Lang et al. |
| 3,253,841 A | 5/1966 | Ahmad |
| 3,266,821 A | 8/1966 | Safford |
| 3,268,240 A * | 8/1966 | Robert, V ............. F16L 15/008 285/55 |
| 3,355,142 A | 11/1967 | Kammerer, Jr. et al. |
| 3,451,119 A | 6/1969 | Coberly et al. |
| 3,521,913 A | 7/1970 | Verhein et al. |
| 3,537,731 A | 11/1970 | Reddy |
| 3,596,931 A | 8/1971 | Mishler |
| 3,955,834 A * | 5/1976 | Ahlrot ................. F24F 13/0209 285/379 |
| 4,043,857 A | 8/1977 | Byrne et al. |
| 4,182,519 A | 1/1980 | Wilson |
| 4,216,981 A * | 8/1980 | Jensen ..................... F16J 15/46 285/97 |
| 4,318,547 A | 3/1982 | Ericson |
| 4,400,019 A | 8/1983 | Fruck |
| 4,507,842 A * | 4/1985 | Werner ................. E21B 17/042 285/55 |
| 4,541,655 A | 9/1985 | Hunter |
| 4,549,752 A | 10/1985 | Nimke et al. |
| 4,664,421 A | 5/1987 | Jones |
| 4,709,946 A | 12/1987 | Hunter |
| 4,773,479 A | 9/1988 | Guy |
| 4,848,807 A | 7/1989 | Christianson |
| 4,852,655 A | 8/1989 | Guy |
| 4,856,828 A | 8/1989 | Kessler et al. |
| 4,921,258 A | 5/1990 | Fournier et al. |
| 4,962,958 A | 10/1990 | Takei |
| 5,282,652 A | 2/1994 | Werner |
| 6,478,341 B1 * | 11/2002 | Miyajima ............... F16L 21/08 285/55 |
| 6,739,632 B1 * | 5/2004 | Thomas ................ F16L 21/035 285/915 |
| 9,850,732 B2 * | 12/2017 | Murty ................... E21B 43/128 |
| 2002/0153725 A1 * | 10/2002 | Myers ..................... F16L 25/14 285/148.18 |
| 2011/0049878 A1 | 3/2011 | Goode |
| 2018/0195649 A1 | 7/2018 | Gledhill |

FOREIGN PATENT DOCUMENTS

| | | |
|---|---|---|
| DE | 2315870 A1 | 10/1974 |
| EP | 275055 A2 | 7/1988 |
| JP | 02-018999 U | 2/1990 |
| JP | 07-139668 A | 5/1995 |
| SE | 37517 | 7/1911 |

OTHER PUBLICATIONS

International Search Report and Written Opinion from Corresponding PCT Patent Application PCT/US22/46138 dated Jan. 31, 2023; Korean Intellectual Property Office.

* cited by examiner

FIG. 1

SECTION A-A

DETAIL B

DETAIL C

DETAIL D

FIG. 5

DETAIL E

FIG. 6

COUPLING SEAL FOR PIPE LINERS

CROSS-REFERENCE

This application is based on and claims priority to U.S. Provisional Patent Application Ser. No. 63/253,614, filed Oct. 8, 2021, which is incorporated herein in its entirety by reference.

BACKGROUND OF THE INVENTION

Field of the Invention

This invention relates to an improved coupler and seal for the joints of a pipe lining system.

Description of the Related Art

The concept of employing a lined pipe in an oil or gas well which is to be treated with or handle highly corrosive fluids is known. Thus, it is known to use a lined steel pipe to deliver acids, caustic fluids and the like to a desired depth in a gas or oil well. The pipe liners may be made of plastic, stainless steel, or other corrosion resistant materials. It is also well known that such pipes or tubing involve the assembling of many shorter pipe sections wherein each pipe joint created at the junction of two pipe sections or of a pipe section and a fitting represents a potential weak point and region susceptible to acid or corrosive attack. Thus, to extend the life of the lined pipe, various gaskets or pipeline couplings have been proposed with varying degrees of success, yet none have proven to be entirely reliable. For example, the use of an internal gasket to be held under compression between the two respective pipe ends seems to be a reasonable solution. However, in practice, the repeated assembling and disassembling of the pipe under oil field conditions quickly leads to a high frequency of pipe joint failure for compressive gasket type pipe couplings. Thus, the need for a reliable yet easily installed and reusable lined pipe joint, particularly for oil field applications, exists.

One solution to this problem is provided in Werner (U.S. Pat. No. 4,507,842). This patent discloses an improved method for sealing and protecting a lined pipe joint which solves many problems associated with using a lined pipe within an oil or gas well in order to deliver a highly corrosive fluid to a selected subterranean stratum. In this patent, a plastic collar seal is used which is placed in the interior of a pipe joint formed between first and second externally threaded lined pipe sections which are to be held together by an internally threaded pipe collar. The collar seal is a hollow, open-ended, cylindrical plastic apparatus pre-sized to concentrically fit within the liner of the sections of lined pipe with minimum clearance. The open ends of the collar seal are internally beveled or chamfered, and the collar seal is equipped with a sealing means, such as O-rings, on each of the ends.

This prior art collar seal is further provided with an external ledge or ridge molded on the collar seal between the O-rings, and the ledge is adapted to fit within the internally threaded collar and rest on the end of one of the lined pipes. The ledge is also referred to as a "no-go" ring. This ledge is positioned such that the distance from at least one end of the collar seal to the ledge exceeds the length of the unengaged portion of the threaded collar.

This apparatus has worked well, but the O-ring seals do not allow for relief of pressure from outside the liner in the event that the pipe is depressurized. That is, gas can migrate through plastic lining in the pipe causing pressure to build up and be trapped outside the lining. If the interior of the pipe is depressurized, the pressure outside of the lining can cause the lining to implode or be deformed inwardly which is an undesirable result. The O-ring seals on the prior art collar seal help keep the pressure outside the lining.

The collar seal of the subsequent patent Werner (U.S. Pat. No. 5,282,652) comprises a sealing check valve means on one side of the collar seal which prevents fluid pressure inside the pipe from leaking outwardly, but which will allow any pressure which accumulates outside the lining, and which enters the coupling or collar at the joint, to be relieved and flow into the interior of the pipe if the pipe is depressurized. Thus, collapse of the pipe lining in such circumstances is prevented.

The improved collar seal of the '562 patent continued to utilize an O-ring seal on one end of the collar seal. Over time and as the system is repeatedly assembled and disassembled, the O-ring seals wear down and tend to break.

The collar seal of the '562 patent also was not symmetrical in that the "no-go" ring was not located at the longitudinal center of the collar seal. Consequently, the device could unintentionally be installed inconsistently and upside-down.

Lastly, the sealing check valve disclosed in the '562 patent tended to break easily with repeated assembly and disassembly.

The present invention solves these problems by provision of a number of novel features including a new kind of check valve, referred to as a "V-cup" seal, symmetrically placed on either side of a "no-go" ring located at the longitudinal center of the collar seal or coupler.

SUMMARY OF THE INVENTION

The present invention relates to a coupler for a lined pipe system and to a lined pipe system.

The coupler for a lined pipe system has lined pipe section ends with an inner diameter, including: a substantially cylindrical hollow body with an outer surface, an inner surface, two opposing open ends, and a longitudinal center between the two opposing open ends; a ridge that extends radially outwardly from the outer surface at the longitudinal center; and a hollow radial barb, with a point having a maximum diameter and a hollow section, symmetrically disposed on the outer surface between each opposing open end and the ridge wherein the radial barbs extend outwardly from the outer surface and away from the ridge.

The maximum diameter of the radial barb may be greater than the inner diameter of the lined pipe section ends.

The outer surface may be cylindrical between the radial barb and the ridge.

The outer surface may further comprise a conical section, having a wide end and a narrow end, disposed between each of the two opposing open ends and the radial barb whereby the wide end is disposed about the two opposing open ends and the narrow end terminates inside the hollow section of the radial barb.

The two opposing open ends may be smaller than and fit concentrically within the inner diameter of the lined pipe section ends.

The ridge may be larger than the inner diameter of the lined pipe section ends.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

Figure 1:
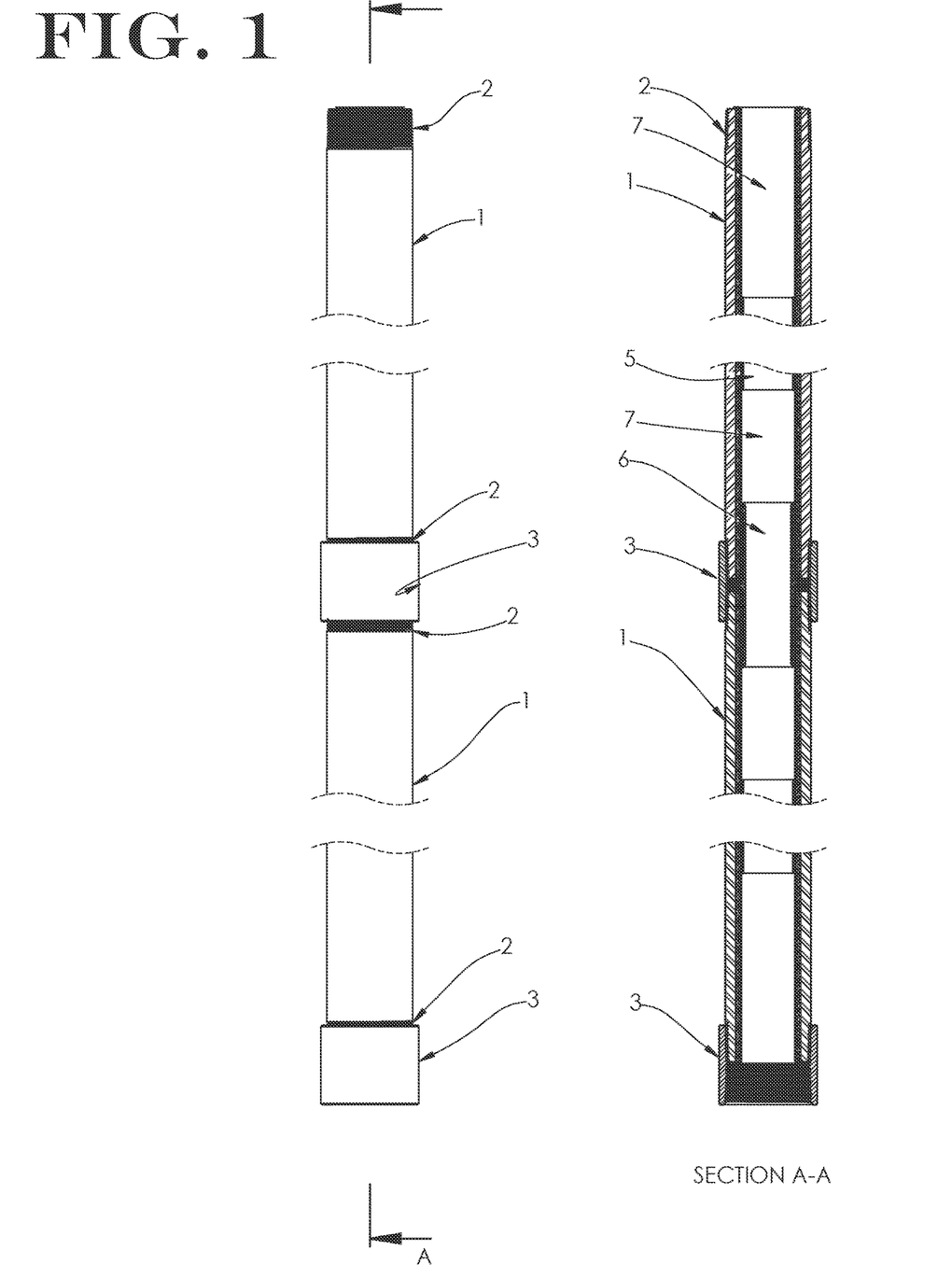
FIG. 1 is a view of a lined pipe system; Section A-A is a longitudinal cross-sectional view of the lined pipe system utilizing a coupler of the present invention.

Referring now to the drawings, FIG. 1 shows a lined pipe system having a number of cylindrical pipe sections 1. In the lined pipe system, each pipe section 1 typically has threaded sections 2 on the outer surface at each end. Adjacent pipe sections 1 can then be joined by an internally threaded collar 3 that threadably receive two pipe section ends. The pipe joints created by joining of two pipe sections 1 are potential weak points for corrosion of the pipe sections 1. The broken cutaway lines in FIG. 1 indicate that the pipe sections 1 may vary in length.

Figure 2:
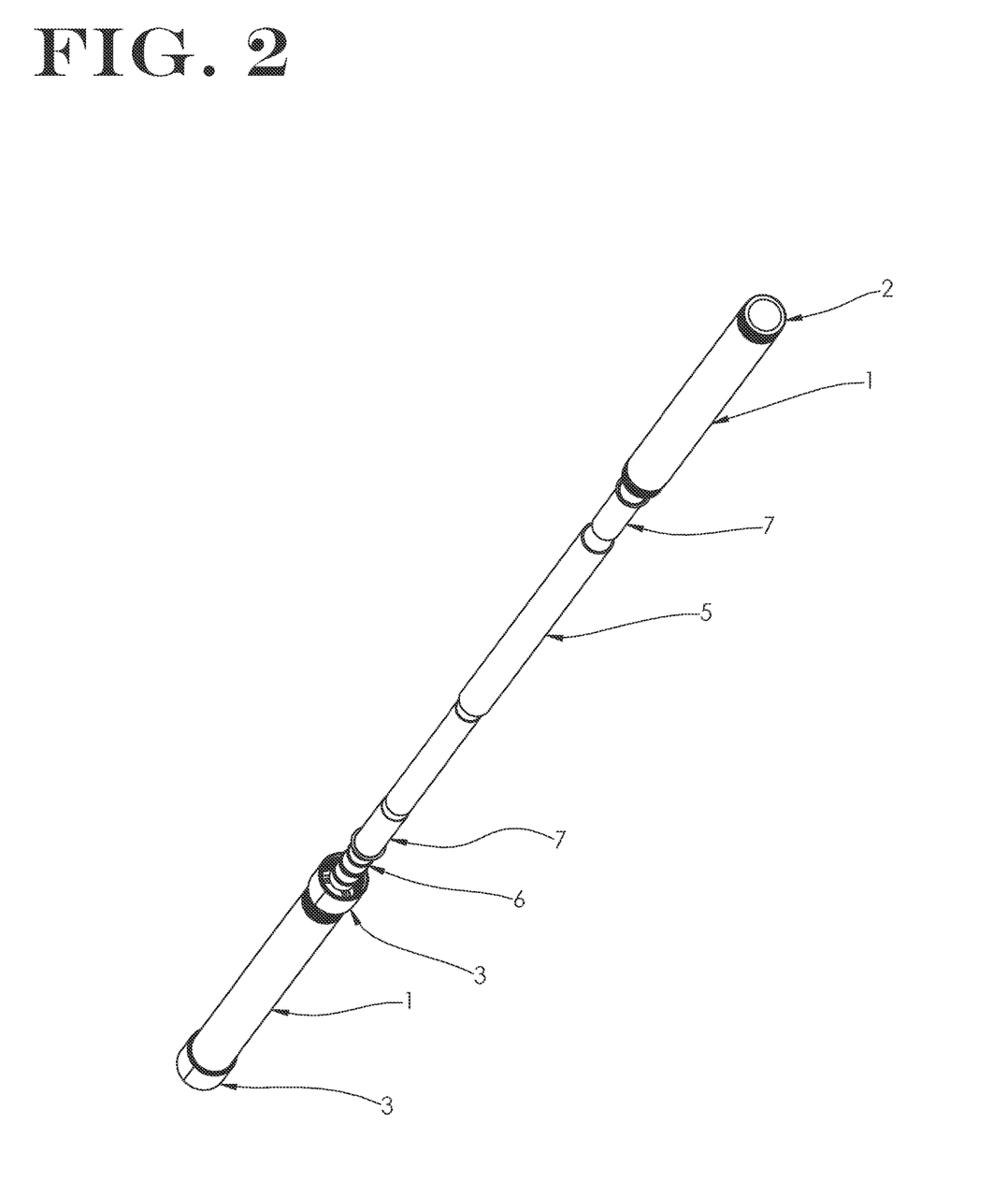
FIG. 2 is an exploded view of the lined pipe system utilizing the coupler of the present invention as shown in FIG. 1.
Figure 3:
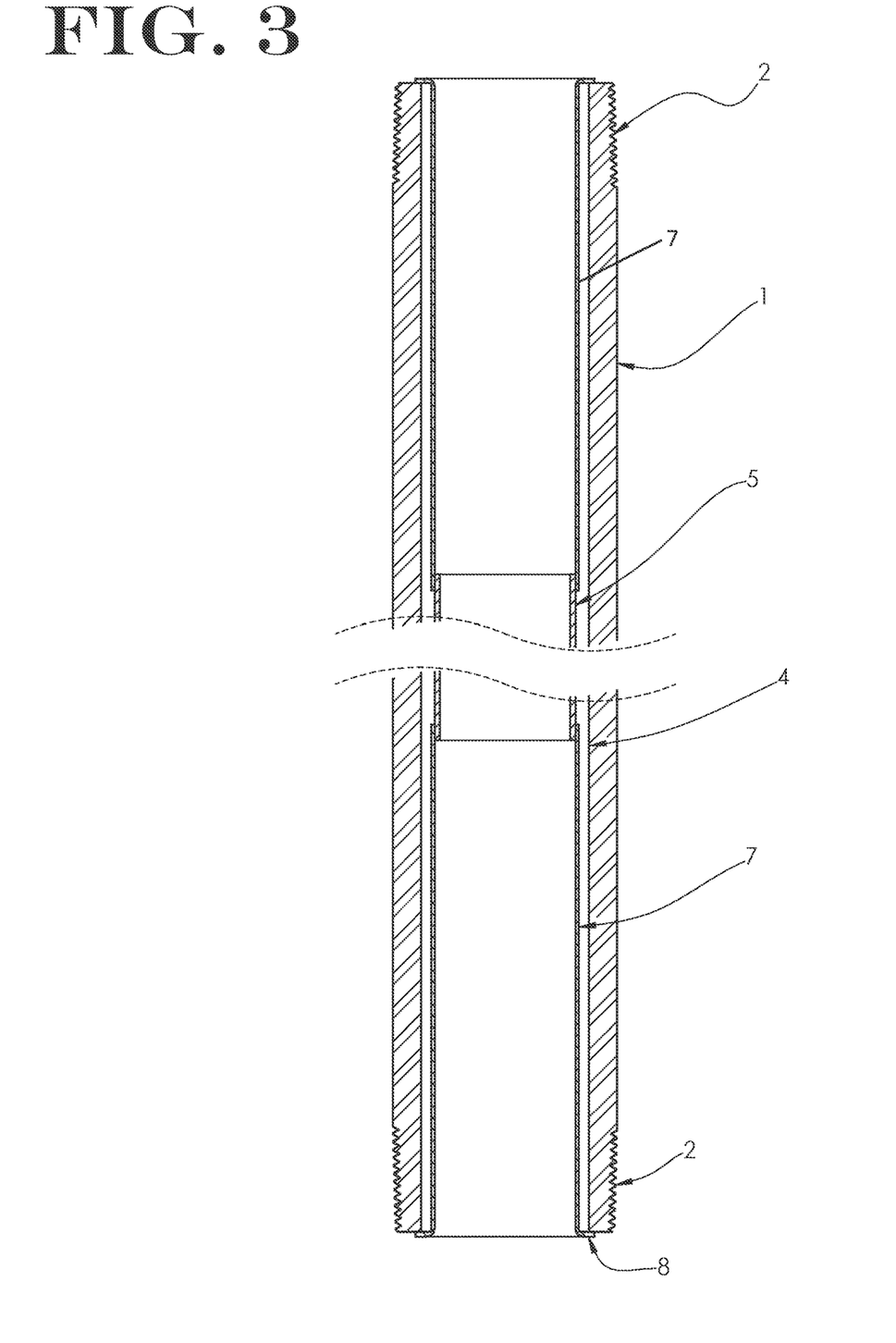
FIG. 3 is a longitudinal cross-sectional view of a section of lined pipe in a lined pipe system as shown in FIGS. 1 and 2.

Section A-A of FIG. 1 shows a longitudinal cross-sectional view of the lined pipe system taken along line A-A. FIG. 2 shows an exploded view of the lined pipe system according to one embodiment of the present invention. FIG. 3 shows a longitudinal cross-sectional view of a single section of lined pipe. A pipe liner section 5 may be installed within a pipe section 1 using a layer of grout 4. The grout may be hydraulic cement, cement with polymer, epoxy resins, or the like.

Preferably, each pipe section 1 will have two pipe liner ends 7. One pipe liner end 7 fits concentrically within the pipe liner section 5 at each end of the pipe section 1 and may have a splayed section 8 which extends radially outwardly and may abut the end of both the pipe liner section 5 and the pipe section 1. At each pipe joint, each end of a coupler 6 may be situated within two pipe liner ends 7 such that the splayed section 8 of each piper liner end 7 is contiguous with a side of the ridge of the coupler 9.

Figure 4:
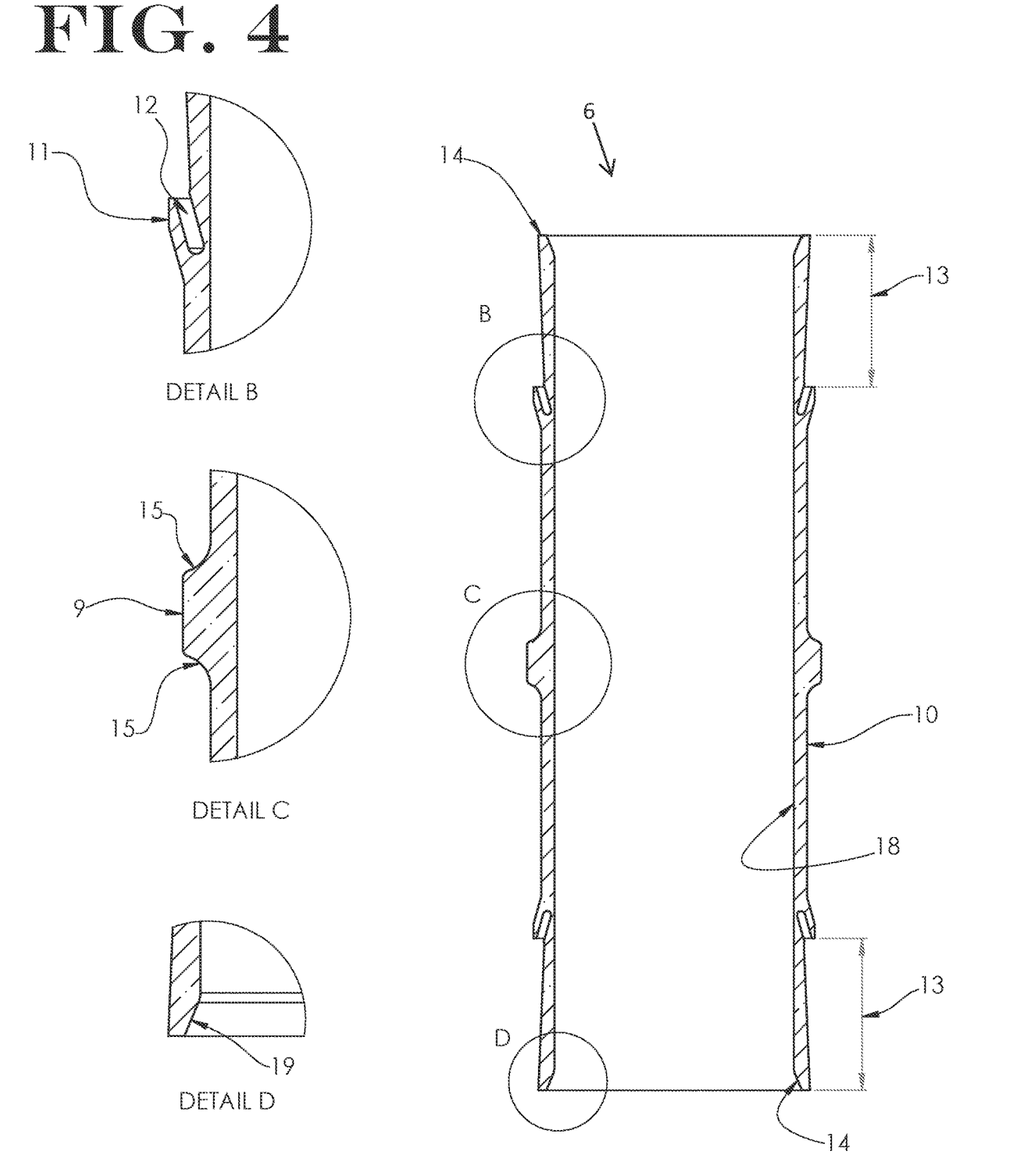
FIG. 4 is a longitudinal cross-sectional view of the coupler of the claimed invention; Detail B shows an enlarged view of the check valve; Detail C shows an enlarged view of the "no-go" ring; and Detail D shows an enlarged view of the chamfered inner surface of the coupler ends.

FIG. 4 shows a longitudinal cross-sectional view of one embodiment of the coupler 6 of the present invention. As can be seen, the coupler 6 is substantially cylindrical with an outer surface 10, an inner surface 18, and two opposing open ends 14.

Details B, C, and D shows enlarged portions of the coupler in FIG. 4. As can be seen best in Detail C, a ridge 9 extends radially outwardly from the outer surface of the coupler 10 at approximately the longitudinal center of the coupler 6.

The ridge 9 of the coupler may be larger in diameter than the inner surface of the pipe liner ends 7 so that the coupler may be held in place between the pipe liner ends 7 because the ridge 9 cannot fit inside the pipe liner ends 7.

Figure 5:
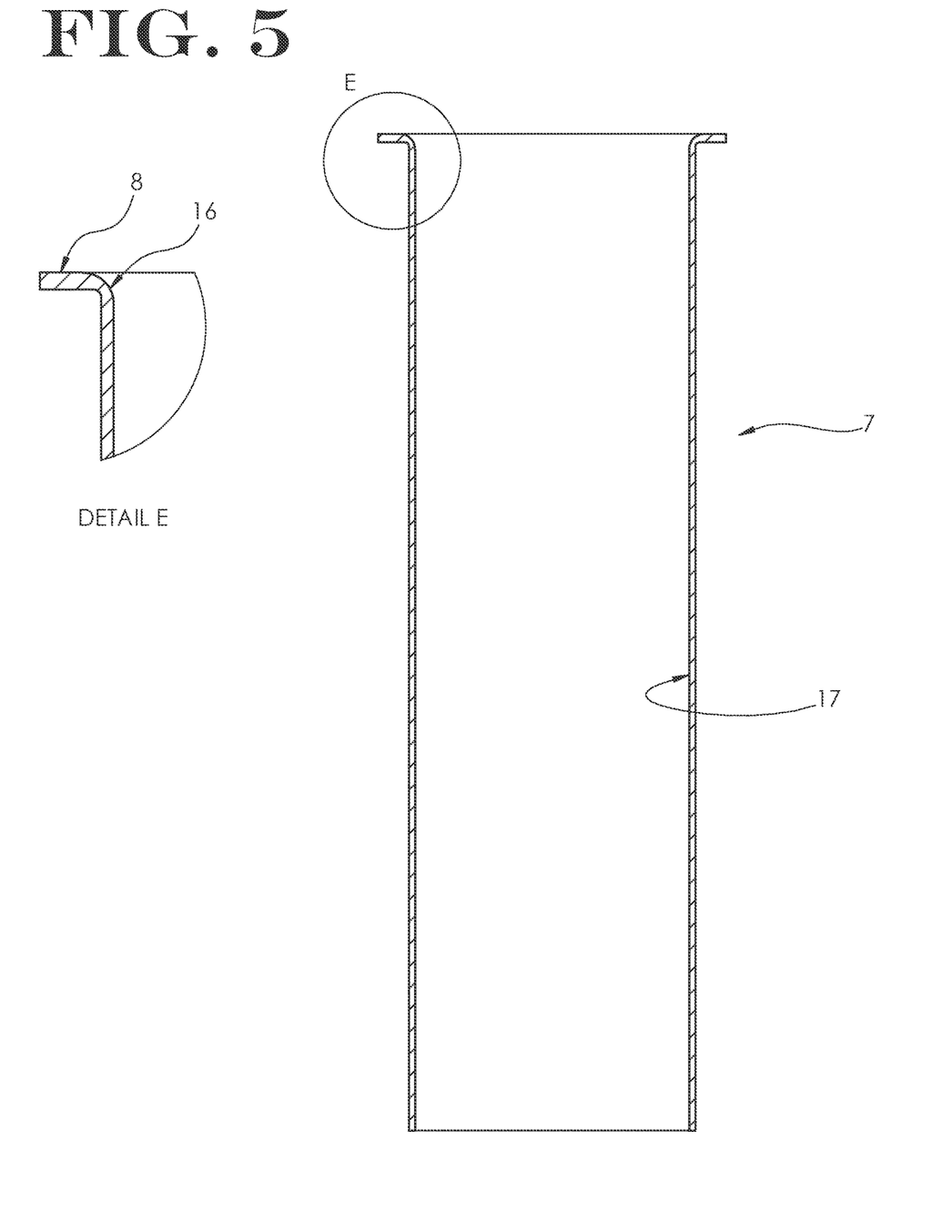
FIG. 5 is a longitudinal cross-sectional view of the pipe liner end; and Detail E shows a close-up view of the splayed and beveled section of the pipe liner end.

Further, the ridge 9 of the coupler may be sloped slightly on either side 15. FIG. 5 shows a longitudinal cross-sectional view of a pipe liner end 7. As can be seen best in Detail E, the pipe liner end may have a splayed section 8 and beveling 16 on the end of the inner surface. The ends of the inner surface of the splayed section of the pipe liner ends 8 may be similarly sloped 16. Accordingly, a channel is created between the splayed section of the pipe liner ends 8 and the ridge 9.

Returning to a consideration of FIG. 4, at least one hollow radial barb 11, also known as a "V-cup", is situated symmetrically on either side of the ridge 9 on the outer surface of the coupler 10 near the open ends 14 of the coupler. The radial barb 9 may be designed such that it extends outwardly from the outer surface 10 of the coupler and away from the ridge 9. The radial barb 11 may be flexible such that it can be flexed inwardly towards the outer surface of the coupler 10. An open hollow section 12 of the radial barb 11 opens on the sides of the radial barbs that are toward the open ends 14 of the coupler 6.

Figure 6:
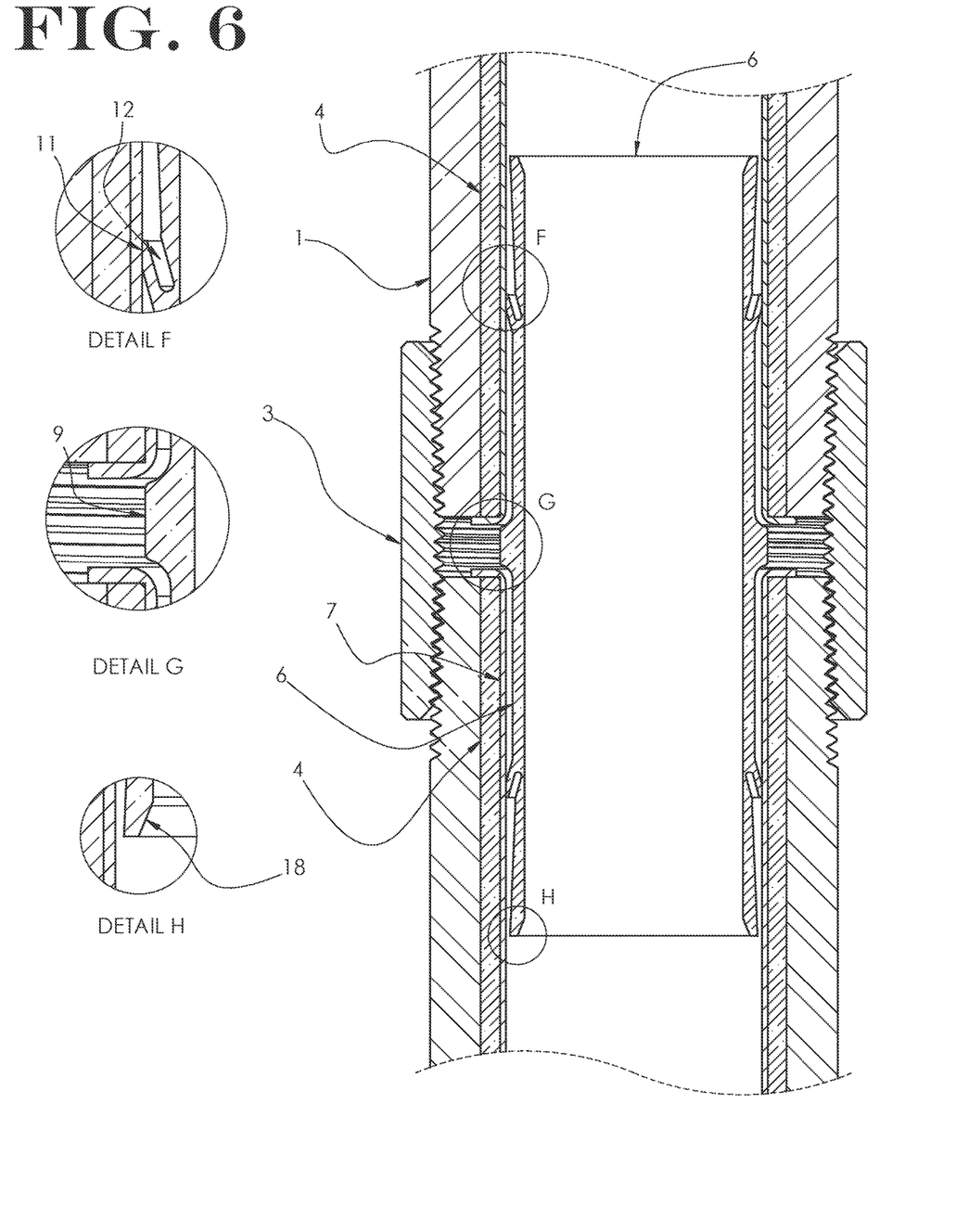
FIG. 6 is a longitudinal cross-sectional view of the coupler installed within a lined pipe system; Detail F shows a close-up view of the radial barb on the outer surface of the coupler; Detail G shows a close-up view of the ridge on the outer surface of the coupler; and Detail H shows the chamfered inner surface of the coupler.

FIG. 6 shows a sectional view of an assembled pipe lining system including the coupler 6.

The diameter of the tip of the radial barb 11 may be larger than the diameter of inner surface of the pipe liner end 7 so that the tip flexes to ensure a tight seal is made between the coupler 6 and the pipe liner end 7.

The radial barb 11 may act as a check valve such that if the space in the pipe joint outside of the pipe liner has a higher pressure than inside, the flexible radial barb 11 flexes inwardly towards the outer surface of the coupler 10 allowing the pressures to equalize between inside and outside of the pipe liner. Allowing the pressures to equalize prevents the pipe lining system from imploding and damaging the system.

Conversely, if pressure inside the pipe liner is greater than outside the pipe liner, the hollow section of the radial barb 12 is pressurized such that the pressure pushes the barb towards the inner surface of the pipe liner 17 thereby strengthening the seal.

In a preferred embodiment of the present invention, the outer surface of the coupler 10 may be substantially cylindrical between the radial barb 11 and the ridge 9 in order to strengthen the radial barb 11 and prevent it from breaking.

The diameter of the outer surface of the coupler 10 at the opposing ends 14 may be smaller and fit concentrically within the inner surface of the pipe liner end 17. Further, the outer surface of the coupler 10 may have conical sections between the two opposing ends and the radial barbs such that the diameter of the outer surface tapers slightly from the opposing ends 14 to the hollow section of the radial barb 12. The conical recession in the outer surface of the coupler 10 ensures that the hollow section of the radial barb 12 is in fluid communication with the inside of the lined pipe without compromising the strength and durability of the seal.

The tip of the radial barb 11 may be chamfered such that a portion of the surface of the radial barb 11 may rest flush against the inner surface of the lined pipe end 17.

The inner surface of the coupler 18 may be substantially cylindrical throughout. As can be seen best in Detail D, however, either end of the inner surface of the coupler may be chamfered 19 in order to reduce turbulence as liquid or gas travel through the couplers in the lined pipe system.

Whereas, the invention has been described in relation to the drawings attached hereto, it should be understood that other and further modifications, apart from those shown or suggested herein, may be made within the scope of this invention.

What is claimed is:

1. A coupler for a lined pipe system having lined pipe section ends with an inner diameter, said coupler comprising:
    a substantially cylindrical hollow body with an outer surface, an inner surface, two opposing open ends, and a longitudinal center between the two opposing open ends;
    a ridge that extends radially outwardly from the outer surface at the longitudinal center; and
    at least one radial barb with a point having a maximum diameter, the at least one radial barb_disposed on the outer surface between each opposing open end and the ridge wherein the at least one radial barb extends outwardly from the outer surface and away from the ridge such that there is a space between the outer surface and at least a portion of the radial barb;
    where the outer surface comprises a conical section having a wide end and a narrow end between the two opposing open ends and the radial barb whereby the wide end is disposed about the two opposing open ends and the narrow end terminates inside the hollow section of the space between the radial barb and the outer surface.

2. The coupler for a lined pipe system of claim 1 wherein the maximum diameter of the radial barb is greater than the inner diameter of the lined pipe section ends.

3. The coupler for a lined pipe system of claim 1 wherein the outer surface of the hollow body is cylindrical between the radial barb and the ridge.

4. The coupler for a lined pipe system of claim 1 wherein the two opposing open ends are smaller than and fit concentrically within the inner diameter of the lined pipe section ends.

5. The coupler for a lined pipe system of claim 1 wherein the ridge is larger than the inner diameter of the lined pipe section ends.

6. The coupler for a lined pipe system of claim 1 wherein the inner surface of the hollow body is substantially cylindrical throughout.

7. The coupler for a lined pipe system of claim 6 wherein the inner surface of the hollow body is chamfered at each end.

8. The coupler for a lined pipe system of claim 1 wherein a portion of the radial barb is beveled.

9. A lined pipe system which comprises:
    a plurality of pipe sections wherein adjacent pipe sections are joined together by a threaded collar;
    a pipe liner section within each of said plurality of pipe sections;
    a pair of pipe liner ends within each of said plurality of pipe sections, wherein each said pipe liner ends includes a splayed section extending radially outward and abutting an end of each pipe section;
    a coupler having a substantially hollow body with an outer surface, a ridge that extends radially outwardly from the outer surface between opposing ends of the coupler; and
    at least one radial barb with a point having a maximum diameter, the at least one radial barb disposed on the outer surface between each opposing open end and the ridge wherein the radial barb extends outwardly from the outer surface and away from the ridge such that there is a space between the outer surface and at least a portion of the radial barb;
    where the outer surface comprises a conical section having a wide end and a narrow end between the two opposing open ends and the radial barb whereby the wide end is disposed about the two opposing open ends and the narrow end terminates inside the hollow section of the space between the radial barb and the outer surface.

10. The lined pipe system as set forth in claim 9 wherein the cylindrical hollow body has an inner surface, two opposing open ends, and a longitudinal center between the two opposing open ends and wherein the maximum diameter of said each radial barb is greater than the inner diameter of the lined pipe section ends.

* * * * *